United States Patent [19]

McCaskill et al.

[11] Patent Number: 4,698,625
[45] Date of Patent: Oct. 6, 1987

[54] GRAPHIC HIGHLIGHT ADJACENT A POINTING CURSOR

[75] Inventors: Rex A. McCaskill; John S. Wang, both of Travis County, Tex.

[73] Assignee: International Business Machines Corp., Armonk, N.Y.

[21] Appl. No.: 739,371

[22] Filed: May 30, 1985

[51] Int. Cl.$^4$ ............................................. G09G 1/16
[52] U.S. Cl. .................................. 340/709; 340/706; 340/723
[58] Field of Search ............................. 340/706–709, 340/721, 723, 710, 715; 178/18

[56] References Cited

U.S. PATENT DOCUMENTS

| | | | |
|---|---|---|---|
| 4,181,952 | 1/1980 | Casey et al. | 340/709 X |
| 4,190,835 | 2/1980 | Buynak | 340/709 X |
| 4,224,614 | 9/1980 | Devchoudhury | 340/709 X |
| 4,228,430 | 10/1980 | Iwamura et al. | 340/709 |
| 4,386,346 | 5/1983 | Levine | 340/709 |
| 4,528,560 | 7/1985 | Bergermann et al. | 340/709 |
| 4,587,520 | 5/1986 | Astle | 340/709 X |
| 4,590,464 | 5/1986 | Imaizumi et al. | 340/709 X |

OTHER PUBLICATIONS

*The Lisa Computer System*, Gregg Williams, BYTE Publications, Feb. 1983, pp. 33–50.
Koehler et al., "MacPaint TM", Apple Computer Corp., copyright 1983.

*Primary Examiner*—Gerald L. Brigance
*Assistant Examiner*—Ruffin B. Cordell
*Attorney, Agent, or Firm*—C. Lamont Whitham

[57] ABSTRACT

A technique is disclosed which facilitates the selection by a user of a graphic object on a display screen. Selection is by means of a pointing cursor which is moved about the display screen by means of a pointing device having a select button. When the pointing cursor is brought within a predetermined distance of a graphic object, the point on the graphic object closest to the pointing cursor is highlighted to show the user that that graphic object would be selected if the select button were pressed. If the user presses the select button when a point on a graphic object is highlighted, the entire graphic object is highlighted to indicate that it has been selected.

10 Claims, 5 Drawing Figures

GRAPHIC HIGHLIGHT ADJACENT A POINTING CURSOR

DESCRIPTION

Cross Reference to Related Applications

The invention disclosed in this application is related in subject matter to the inventions disclosed in the following patent applications which are assigned to the assignee of this application:

Ser. No. 06/645,622 filed Aug. 30, 1984, by Barbara A. Barker and Rex A. McCaskill for "Superblock Structure in a Multiple Data Editor";

Ser. No. 06/645,620 filed Aug. 30, 1984, by Barbara A. Barker and Irene H. Hernandez for "Implicit Creation of a Superblock Structure"; and Ser. No. 06/645,630 filed Aug. 30, 1984, by Barbara A. Barker, Irene H. Hernandez and Rex A. McCaskill for "Editing of a Superblock Structure".

The disclosures of the foregoing patent applications are incorporated herein by reference.

Technical Field

The present invention generally relates to data editors and, more particularly, to a technique for facilitating the selection by a user of a graphic object for editing. The invention has particular application in a multiple data editor characterized by a superblock structure containing two or more diverse object sets; however, the technique according to the present invention can be advantageously applied to specialized graphic editors and is therefore not limited to multiple data editors.

DESCRIPTION OF THE PRIOR ART

Graphic editors are used to edit graphic data which may be simple, such as simple graphs and charts, or highly complex, such as complex electrical or mechanical or architectural drawings. The latter are typically produced by computer aided design (CAD) systems. A CAD system may be characterized as being analogous to a word processing system, but for graphic data rather than text data. It is necessary in the course of editing graphic data for the user to select the data on the display screen which is to be edited. This is generally done by moving a pointing cursor on the screen with a pointing device, such as a mouse, to the graphic desired graphic object and then selecting that object by, for example, pressing a button on the mouse provided for that purpose. While this process is quite straight forward, in actual practice it can, at times, prove to be very frustrating for the user. When the desired graphic object is close to some other graphic object, the wrong graphic object can be inadvertantly selected. Thus, the user may think that s/he is currently pointing to graphic object A and, after pressing the select button on the mouse, discovers that object B has been selected instead. In a complex graphics display, the user may have to try several times in order to make the correct selection.

In the multiple data editor described, for example, in copending patent application Ser. No. 06/645,622 referenced above, two or more diverse object sets may be positioned so that the object sets overlap one another, reside side-by-side, or extend above or below one another. The object sets may be text, graphics or tables, for example, and because of the compact display of multiple object sets on a single page, there exists the same problem of selecting graphic data for editing.

What is needed is a simple way to supply the user with useful information to aid in the selection of graphic data for editing.

SUMMARY OF THE INVENTION

It is therefore an object of the present invention to provide a technique for assisting a user of a graphic data editor in the selection of a displayed graphic object for editing.

It is another object of the invention to provide a graphic data editor with a means for providing a user with useful information to aid in the selection of graphic data for editing.

It is a further object of the invention to provide a multiple data editor in which multiple, diverse data sets including graphic data sets are easily edited with a user friendly way in which to select graphic objects within a graphic data set which may be displayed on the same screen as other and different data sets.

The foregoing and other objects of the invention are accomplished by means of a conventional pointing cursor wherein if the pointing cursor is moved near a displayed graphic object, then the nearest point on the graphic object is highlighted. Highlighting the closest point in the graphic object may be by a small dot of increased intensity or color or by a blinking dot or a small circle or other geometric figure or a combination of these. The highlighted point on the graphic object provides the user with a clear visual indication that the graphic object will be selected if the user presses the select button.

BRIEF DESCRIPTION OF THE DRAWINGS

The foregoing and other objects, aspects and advantages of the invention will be better understood from the following detailed description of the invention with reference to the following drawings, in which.

DETAILED DESCRIPTION OF A PREFERED EMBODIMENT OF THE INVENTION

A pointing cursor as used herein is a cursor in the form of an arrow or other appropriate shape which is freely movable around a display screen. The means for moving the pointing cursor may be a keyboard with specially provided cursor keys, but in general practice the preferred means is a pointing device such as a mouse or digitizing tablet. Both of these devices operate as relative position devices wherein as the mouse, for example, is moved about on a flat surface, the displayed pointing cursor moves in the direction the mouse is moved. Typically, the mouse is picked up from the flat surface and then moved along the flat surface several times in the same general location in order to make the displayed pointing cursor move greater distances on the display screen. If the displayed pointing cursor is moved out of the displayed area, the display is made to scroll so that the pointing cursor always remains within the visual displayed area. A similar operation can be achieved with the digitizing tablet except that a hand-held cursor, not to be confused with the displayed pointing cursor, is moved over the surface of the digitizing tablet in order to effect movement of the displayed pointing cursor. The mouse and the hand-held cursor are generally provided with two or more buttons which may be easily pressed by the index finger, for example, of the user's hand which is holding the device. One of these buttons is typically the select button which, when pressed, indicates that the displayed object nearest the displayed pointing cursor is to be selected for some operation. Pointing cursors are used not only to select a graphic object for editing as in the subject invention, but also to select an icon representing a command in the application program.

Figure 1:
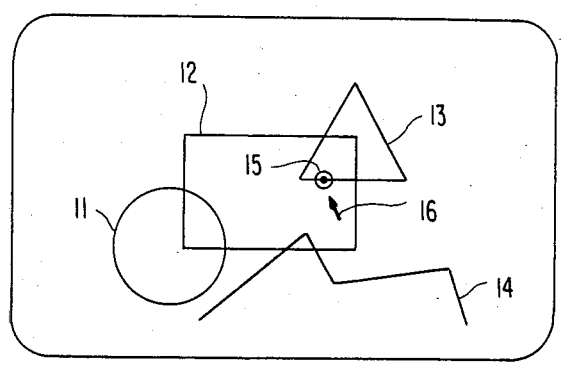
FIG. 1 is an illustration of an all points addressable display screen on which is displayed several graphic objects.

In the subject invention, as the user moves the displayed pointing cursor around a graphics area on a display screen, a small portion of a graphic object which is within a predetermined distance of the pointing cursor is highlighted to indicate to the user which graphic object will be selected if s/he presses the select button. This is illustrated in FIG. 1 of the drawings which shows an all points addressable display screen on which several graphic objects are displayed. These include a circle 11, a rectangle 12, a triangle 13, and a polyline 14. A point 15 on the triangle is highlighted to indicate that the pointing cursor 16 is pointing at the triangle 13. Should the user press the select button, the entire graphic object, i.e., the triangle 13 for the case illustrated, is highlighted to indicate selection. It is also possible to deselect a selected graphic object, and this is done by moving the displayed pointing cursor away from the object and again pressing the select button. When this is done, the graphic object is deselected and dehighlighted. This feature further enhances the invention and adds to the user friendliness of the graphic data editor.

Figure 2:
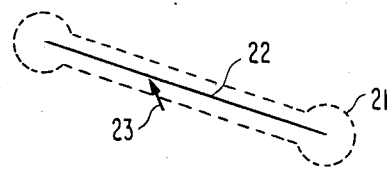
FIG. 2 is an illustration of the gravity field of a line segment showing the relationship of the pointing cursor to the line segment.
Figure 3:
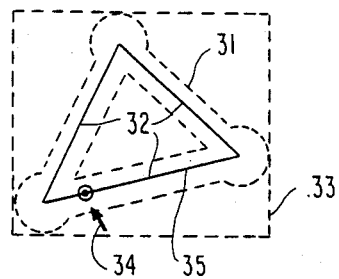
FIG. 3 is an illustration of the gravity field of a triangle showing the relationship of the pointing cursor to the triangle.

FIG. 2 shows the gravity field 21 of a line segment 22. If the pointing cursor 23 is inside the area of the gravity field 21 of the line segment 22, it is considered as pointing to the line segment. FIG. 3 shows the gravity field 31 of a triangle 32 which is the union of the gravity field of the line segments of the triangle. The gravity field extension box 33 is also shown. The pointing cursor 34 is in the gravity extension box 33 of the triangle 32; therefore, the system will consider whether the pointing cursor may be pointing at the triangle. Since the pointing cursor 34 is in the gravity field of a line segment 35 of the triangle 32, the cursor is pointing to the line segment 35. The nearest point on the line segment 35 to the cursor 34 is the point highlighted. If more than one line segment is pointed to by the pointing cursor 34, then the point nearest the pointing cursor is selected as the point to highlight, and the corresponding object is selected.

The following is a pseudocode description of an implementation of the invention. The pseudocode is written in Program Design Language (PDL) from which source and object code may be readily derived by one of ordinary skill in the programming arts. This description represents the logic of the implementation. The performance of this implementation has been tested and found to work satisfactorily. The speed of the performance could be improved if the slope of every line segment of the graphics displayed were stored in the system instead of calculating slopes on the fly; however, a large amount of storage would be required to improve the speed of performance. The present implementation therefore represents a tradeoff between storage requirements and speed.

In the following description, there are several definitions that must be made. First, the gravity field extension of a graphic object is defined as the minimum size of a rectangle such that the graphic object can fit into the rectangle. Second, the gravity field of a graphic object is defined as the area which surrounds the graphic extension with a distance equal to a predefined value (ten pixels, for example). Third, a graphic object is pointed by a pointing cursor if there exists a line segment within that object such that the distance between that line to the current pointing cursor position is either less than or equal to the predefined gravity distance.

```
PROCEDURE FOR GRAPHIC_HIGHLIGHT:
* PURPOSE:  Trace the pointing cursor to perform    *
*           the highlight/dehighlight while the     *
*           pointing cursor is moving within the    *
*           graphic space. Exit when the select     *
*           button is recognized and highlight      *
*           the pointed object if any.              *
Initialize the pointed_object to nil;
Initialize the previous_object to nil;
REPEAT
    Read pointing cursor position (x,y);
    CALL NEAREST_POINT;
    IF the pointing cursor is pointing to a graphic object
        THEN set new_point = current nearest point;
        IF previous_point < > new-point
            THEN
                IF previous_point < > nil
                    THEN dehighlight the previous_point;
                ENDIF
                Highlight the new_point;
                Set previous_point = new_point;
        ENDIF;
    ELSE
        IF previous_point < > nil
            THEN Dehighlight the previous_point;
            Set previous point to nil;
        ENDIF;
    ENDIF;
UNTIL select button is pressed;
IF pointed_object < > nil
    THEN highlight the pointed_object;
```

Figure 4:
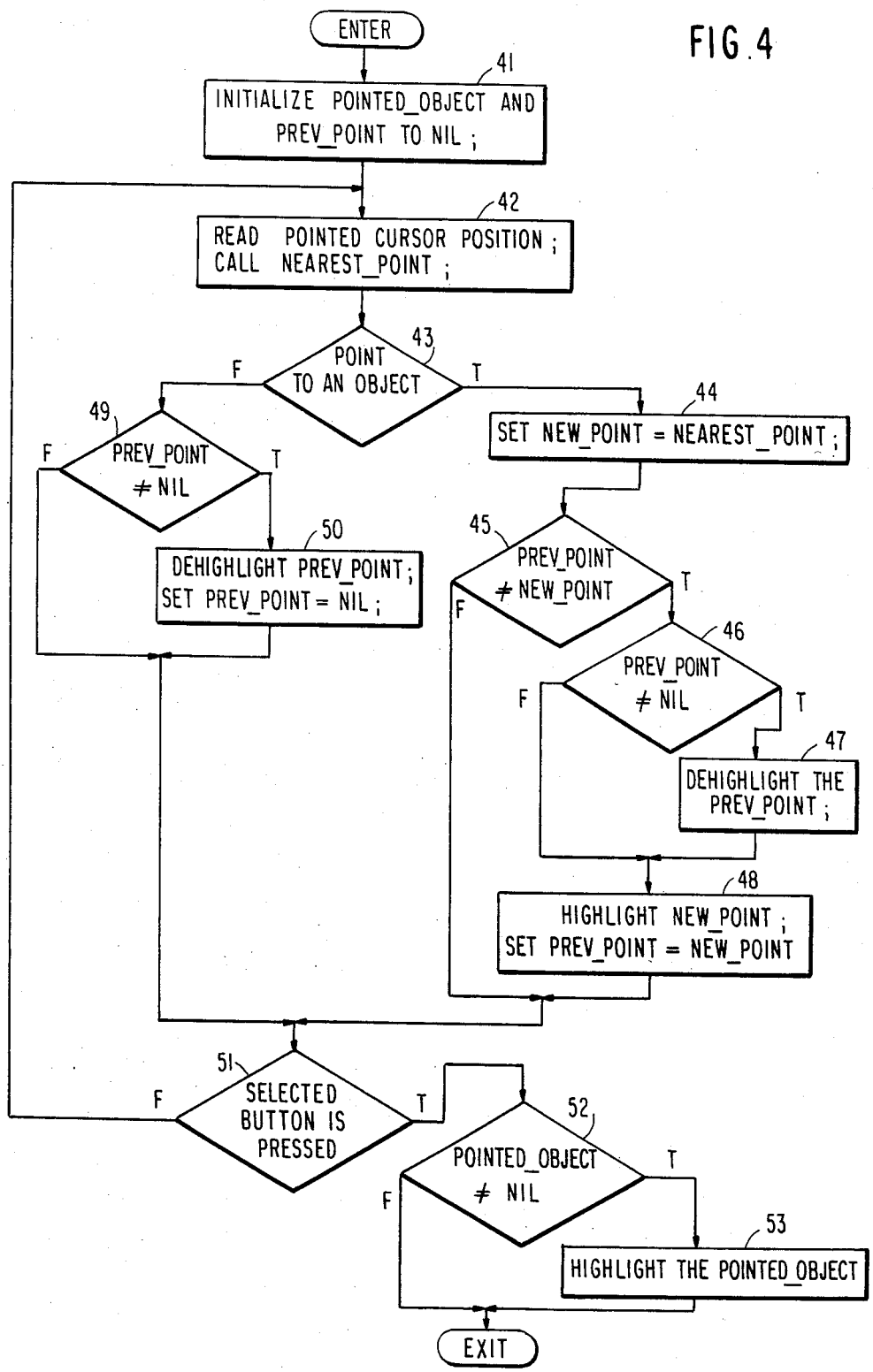
FIG. 4 is a flow chart showing the procedure for "Graphic_Highlight"

FIG. 4 shows the flow chart for the "Graphic_Highlight" procedure. The starting point for this flow chart assumes that the operator is currently editing a graphic space using a mouse to position a pointing cursor on the display. Control will stay in this flow chart until the operator leaves the graphic space.

Block 41 initializes both the pointed_object and previous point to nil. In block 42, the current position of the pointing cursor is read and the nearest point is computed by calling the procedure NEAREST_POINT. A test is made in decision block 43 on the result which is passed back from the procedure NEAREST_POINT. If the current pointing cursor is pointing to a graphic object, then in block 44 the new_point is set equal to the nearest point which was passed back from the procedure NEAREST_POINT. A test is then performed in decision block 45 to see if the previous point and the new point are the same. If they are not the same, then a test is made in decision block 46 to determine if the previous point is defined. If the previous point is defined, then the previous point is dehighlighted in block 47. In either case, the IF statement of decision block 46 is completed. The new point is highlighted in block 48, and the previous point is set equal to the new point. The IF statement of decision block 45 is then completed. If the pointing cursor is not pointing to any graphic object in decision block 43, then in decision block 49 a test is made to determine if the previous point is defined. If the previous point is defined implying that the previous point was the last highlighted point, then the previous point is dehighlighted in block 50, and the previous point is set back to nil. The IF statement of decision block 49 is then completed followed by the completion of the IF statement in decision block 43. Then in decision block 51, a test is made to determine if the select button is pressed at this moment. If the select button is not pressed, then the process loops back to block 42. On the other hand, if the select button is pressed, then a test is made in decision block 52 to see if the pointed object is found. If it is found, then the whole graphic object is highlighted. In either case, the IF statement of the test in decision block 52 is completed, and the flow chart is exited.

The following is a PDL listing for the "Nearest_Point" procedure. Again, a skilled programmer can derive source and object code from the this PDL listing.

```
PROCEDURE NEAREST_POINT:
* PURPOSE:  Find the pointed object by using the
*           nearest point algorithm.
* INPUT:    (x,y) - the current pointing cursor
*           position and the graphic objects within
*           the graphic space.
* OUTPUT:   Return the pointed graphic object
*           along with the nearest point (x,y).
*           Return nil if cursor is not pointing
*           to any object.
Initialize the nearest_distance to the predefined
    gravity distance.
Initialize the pointed_object to nil:
Get the first graphic object in the graphic space;
REPEAT
    IF the cursor location is in the gravity field
       of this graphic object
       THEN Get the first line segment
           (x1,y1) — (x2,y2);
       REPEAT
           Compute the distance from the cursor
           position (x0,y0) to that line segment
           (x1,y1) — (x2,y2) by the formula as follows:

slope = (y2 — y1)/(x2 — x1);
              x = (x1 * slope + x0/slope — y1 +
                  y0)/(slope + 1/slope);
              y = (y2 — y1) * (x — x1)/(x2 — x1) + y1;
              distance = SQRT((x — x0)**2 +
                  (y — y0)**2);

IF distance < nearest_distance
              THEN set nearest_distance to distance;
                   set nearest_(x,y) to (x,y);
                   set pointed_object = current_graphic object;
           ENDIF;
           Get the next line segment
              (x1,y1) — (x2,y2);
       UNTIL all the line segments of this graphic
           object have been examined;
    ENDIF;
    Get the next graphic object in the graphic space;
UNTIL all the graphic objects in the graphic
    space have been computed;
RETURN with pointed_object and nearest_(x,y);
```

Figure 5:
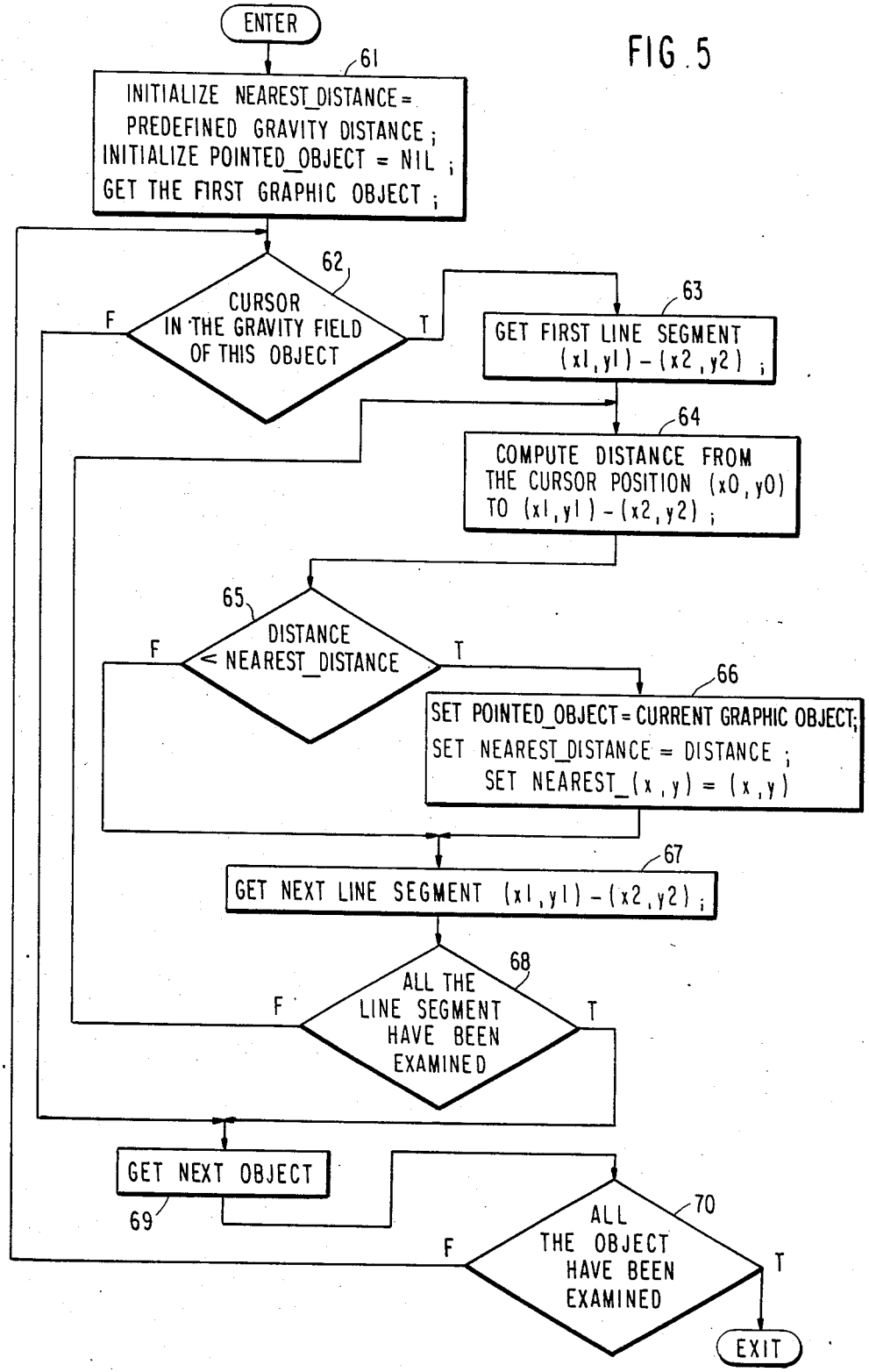
FIG. 5 is a flow chart showing the procedure for "Nearest_Point".

The flow chart for the "Nearest_Point" procedure is shown in FIG. 5. This flow chart is entered at block 61 by initializing the nearest distance to a previously defined gravity distance. The pointed object is also initialized, and the first graphic object in the graphic space is picked. In decision block 62 a test is made on the pointing cursor to see if it is inside the gravity field of this graphic object. If the test is true, then in block 63 the first line segment of this graphic object is retrieved. Next, in block 64, the distance between the current pointing cursor position and this line segment is computed. A test is made in decision block 65 to determine if the computed distance is less than the nearest distance. If the test is true, then in block 66 the pointed object is set equal to the current graphic object. In addition, the nearest distance is set equal to the current distance, and the nearest_(x,y) is set equal to the current pointing cursor position (x,y). The IF statement of decision block 65 is then completed and, in block 67, the next line segment within the current graphic object is retrieved. A test is made in decision block 68 to see if every line segment of the current graphic object has been examined. If not, then the procedure loops back to block 64; otherwise, the IF statement of decision block 62 is completed. Then, in block 69, the next graphic object within the graphic space is retrieved. A test is made in decision block 70 to see if all the graphic objects within the graphic space have been examined. If not, then the procedure loops back to block 2; otherwise, the flow chart is exited.

While the invention has been described in terms of a preferred embodiment, those skilled in the art will recognize that the technique employed may be modified and used without departing from the scope of the invention. For example, a pointing cursor positioned by means of a pointing device such as a mouse has been assumed in the description of the invention. It will be recognized by those skilled in the art that there are other functional equivalents such as, for example, a touch screen wherein a displayed graphic object is pointed to by an operator by simply touching the screen. Thus, it will be apparent that use of a pointing cursor in the preferred embodiment may be replaced with other means of pointing based on movements or position of the operator or based on movements of a device controlled by the operator.

We claim:

1. A method of facilitating the selection of graphic data on a display screen of a computer comprising the steps of:

displaying a pointing cursor on said display screen;
   pointing to a graphic object displayed on said display screen by moving said pointing cursor on said display screen proximate to said graphic object by means of a pointing device connected to said computer; and
   highlighting only a portion of said graphic object when pointed to by said pointing cursor within a predetermined distance to indicate the object that would be selected by an input signal to said computer, said highlighting step being performed exclusive of the step of displaying said pointing cursor.

2. The method as recited in claim 1 wherein said pointing device has a select button and the step of highlighting is performed when said pointing cursor is moved to within said predetermined distance of the graphic object to indicate that the graphic object would be selected if said select button were pressed.

3. The method as recited in claim 2 wherein the step of highlighting is performed by highlighting the point on the graphic object closest to said pointing cursor.

4. The method as recited in claim 3 wherein highlighting the point is performed by increasing the intensity of the point.

5. The method as recited in claim 3 wherein highlighting the point is performed by changing the color of the point.

6. The method as recited in claim 3 wherein highlighting the point is performed by blinking the point on and off.

7. The method as recited in claim 3 wherein highlighting the point is performed by displaying a geometric shape at the position of the point.

8. The method as recited in claim 7 wherein the step of displaying is performed by generating a circle surrounding the point.

9. The method as recited in claim 3 further comprising the step of highlighting the entire graphic object having a point thereon highlighted when the select button is pressed.

10. The method as recited in claim 9 further wherein a selected graphic object can be deselected comprising the steps of:
- moving said pointing cursor away from the selected and highlighted graphic object;
- pressing the select button again; and
- dehighlighting the now deselected graphic object.

* * * * *